United States Patent
Hayaishi

(10) Patent No.: US 8,036,455 B2
(45) Date of Patent: Oct. 11, 2011

(54) METHOD AND APPARATUS OF ANALYZING AND GENERATING IMAGE DATA

(75) Inventor: Ikuo Hayaishi, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 1274 days.

(21) Appl. No.: 11/705,984

(22) Filed: Feb. 13, 2007

(65) Prior Publication Data

US 2007/0242079 A1      Oct. 18, 2007

(30) Foreign Application Priority Data

Feb. 13, 2006  (JP) ................................ P2006-034789

(51) Int. Cl.
*G06K 9/00*          (2006.01)

(52) U.S. Cl. ...................................... 382/162

(58) Field of Classification Search .......... 382/162–167, 382/300, 181; 358/1.9, 518–538; 345/589–604
See application file for complete search history.

(56) References Cited

U.S. PATENT DOCUMENTS

| | | | | |
|---|---|---|---|---|
| 5,113,252 A * | 5/1992 | Horie et al. | ................... | 358/528 |
| 5,557,412 A | 9/1996 | Saito et al. | | |
| 5,696,594 A | 12/1997 | Saito et al. | | |
| 6,466,334 B1 * | 10/2002 | Komiya et al. | ................ | 358/1.9 |
| 7,345,787 B2 * | 3/2008 | Ito et al. | ......................... | 358/1.9 |
| 7,542,167 B2 * | 6/2009 | Ito et al. | ......................... | 358/1.9 |
| 7,693,332 B2 * | 4/2010 | Hiramatsu | .................... | 382/181 |
| 2006/0256409 A1 * | 11/2006 | Hiramatsu | .................... | 358/538 |

FOREIGN PATENT DOCUMENTS

| | | |
|---|---|---|
| JP | 05-063972 | 3/1993 |
| JP | 06-113112 | 4/1994 |
| JP | 09-233336 | 9/1997 |
| JP | 10-191060 | 7/1998 |
| JP | 2001-218075 | 8/2001 |
| JP | 2005-192162 | 7/2005 |

OTHER PUBLICATIONS

Abstract of Japanese Patent Publication No. 05-063972, Pub. Date: Mar. 12, 1993, Patent Abstracts of Japan.
Abstract of Japanese Patent Publication No. 09-233336, Pub. Date: Sep. 5, 1997, Patent Abstracts of Japan.
Abstract of Japanese Patent Publication No. 2001-218075, Pub. Date: Aug. 10, 2001, Patent Abstracts of Japan.
Abstract of Japanese Patent Publication No. 2005-192162, Pub. Date: Jul. 14, 2005, Patent Abstracts of Japan.
Abstract of Japanese Patent Publication No. 06-113112, Pub. Date: Apr. 22, 1994, Patent Abstracts of Japan.
Abstract of Japanese Patent Publication No. 10-191060, Pub. Date: Jul. 21, 1998, Patent Abstracts of Japan.

* cited by examiner

*Primary Examiner* — Ishrat I Sherali

(57) ABSTRACT

It is received first image data described on the basis of a first color space. It is acquired color space converting information adapted to be used to convert the first image data into second image data described on the basis of a prescribed second color space. The first image data is converted into the second image data in accordance with the color space converting information. A prescribed feature quantity is extracted from the second image data.

3 Claims, 16 Drawing Sheets

FIG. 10

→ 64PIXELS

↓ 64PIXELS

| 1 | 177 | 58 | 170 | 70 | 186 | 79 | 161 | 94 | 171 | 16 | 164 | 24 | 158 | 227 | 6 | 133 | 157 |
|---|---|---|---|---|---|---|---|---|---|---|---|---|---|---|---|---|---|
| 255 | 109 | 212 | 42 | 242 | 5 | 223 | 48 | 209 | 67 | 248 | 81 | 234 | 132 | 56 | 120 | 253 | |
| 123 | 33 | 127 | 181 | 83 | 155 | 105 | 140 | 30 | 150 | 119 | 182 | 40 | 89 | 220 | 163 | 44 | |
| 219 | 91 | 237 | 22 | 121 | 198 | 61 | 188 | 111 | 215 | 3 | 98 | 201 | 140 | 10 | 95 | | |
| 11 | 195 | 53 | 136 | 227 | 37 | 247 | 12 | 233 | 52 | 192 | 135 | 32 | 246 | 113 | 194 | | |
| 99 | 144 | 107 | 184 | 68 | 172 | 97 | 151 | 77 | 173 | 84 | 237 | 123 | 61 | 167 | 46 | | |
| 225 | 40 | 251 | 6 | 217 | 116 | 28 | 196 | 125 | 35 | 207 | 17 | 153 | 203 | 24 | | | |
| 87 | 169 | 78 | 162 | 59 | 146 | 211 | 64 | 254 | 142 | 72 | 178 | 87 | 118 | 228 | | | |
| 190 | 15 | 202 | 111 | 238 | 19 | 93 | 169 | 8 | 110 | 221 | 49 | 249 | 2 | 144 | | | |
| 74 | 246 | 134 | 43 | 174 | 128 | 230 | 50 | 216 | 154 | 26 | 168 | 79 | 184 | | | | |
| 176 | 30 | 98 | 219 | 86 | 34 | 139 | 195 | 101 | 56 | 241 | 127 | 213 | 37 | | | | |
| 69 | 148 | 196 | 2 | 159 | 247 | 89 | 11 | 136 | 185 | 92 | 14 | 108 | | | | | |
| 187 | 41 | 126 | 226 | 106 | 57 | 190 | 115 | 235 | 36 | 208 | 121 | 229 | | | | | |
| 81 | 214 | 92 | 53 | 145 | 204 | 27 | 166 | 74 | 157 | 82 | 165 | 31 | | | | | |
| 232 | 21 | 170 | 240 | 13 | 132 | 252 | 51 | 222 | 4 | 245 | 48 | | | | | | |
| 130 | 155 | 55 | 115 | 183 | 78 | 122 | 196 | 102 | 180 | 65 | 173 | | | | | | |
| 72 | 252 | 100 | 211 | 45 | 231 | 20 | 148 | 39 | 133 | 205 | | | | | | | |
| 202 | 32 | 179 | 5 | 163 | 95 | 191 | 86 | 239 | 111 | 29 | | | | | | | |
| 104 | 143 | 58 | 243 | 70 | 218 | 63 | 161 | 9 | 209 | | | | | | | | |
| 64 | 236 | 129 | 110 | 151 | 25 | 199 | 49 | 172 | 68 | | | | | | | | |
| 171 | 17 | 208 | 38 | 225 | 131 | 99 | 254 | 113 | | | | | | | | | |
| 80 | 191 | 87 | 174 | 76 | 189 | 13 | 143 | | | | | | | | | | |
| 247 | 35 | 152 | 2 | 248 | 55 | | | | | | | | | | | | |
| 140 | 108 | 197 | 127 | 96 | | | | | | | | | | | | | |
| 13 | 215 | 46 | 229 | | | | | | | | | | | | | | |
| 164 | 90 | 180 | | | | | | | | | | | | | | | |
| 52 | 253 | | | | | | | | | | | | | | | | |
| 205 | | | | | | | | | | | | | | | | | |

FIG. 13

| REGION a | REGION b | REGION c | REGION d |
|----------|----------|----------|----------|
| REGION e | REGION f | REGION g | REGION h |
| REGION i | REGION j | REGION k | REGION l |
| REGION m | REGION n | REGION o | REGION p |

METHOD AND APPARATUS OF ANALYZING AND GENERATING IMAGE DATA

BACKGROUND

1. Technical Field

The present invention relates to a technology for analyzing image data so as to extract a feature quantity of an image.

2. Related Art

According to the progress of a digital technology such as a computer, an image has been handled as digitalized image data in recent years. If the image is expressed in a form of image data, the image can be captured to a computer so as to add various corrections or adjustments, and the image data can be outputted to a printer so as to be printed. Although such the image data can be generated using various application programs which work on a computer, various imaging apparatus for generating image data such as a scanner, a digital camera and the like are developed and supplied to a market.

Further, when image data is corrected, the image data is analyzed to extract a feature quantity of image, and corrected corresponding to the extracted feature quantity. For example, Japanese Patent Publication Nos. 5-63972A (JP-A-5-63972) and 9-233336A (JP-A-9-233336). Various values are used as the feature quantity of image and, for example, the minimum grayscale value, the maximum grayscale value, and the average value of grayscale values are used. Since the feature quantity of image can be obtained by analyzing image data, the value of a feature quantity to be obtained depends on a color space of the image data.

However, recently, in order to generate high-quality image data by sufficiently utilizing performances of various imaging apparatus for generating image data, there is a tendency for a specific color space being used for every apparatus, where the specific color space is set corresponding to the characteristic of each imaging apparatus. The feature quantity of image is obtained by analyzing image data. As a result, if the image data is described with a specific color space in each apparatus, the values of feature quantities to be obtained are different. So, there is a problem that the feature quantities cannot be utilized across various image data even if those are extracted.

SUMMARY

It is therefore one advantageous aspect of the invention to provide a technology for extracting feature quantities capable of being utilized across various image data even if the image data are described with different color spaces.

According to one aspect of the invention, there is provided a method of processing image data, comprising:

receiving first image data described on the basis of a first color space;

acquiring color space converting information adapted to be used to convert the first image data into second image data described on the basis of a prescribed second color space;

converting the first image data into the second image data in accordance with the color space converting information; and extracting a prescribed feature quantity from the second image data.

The second color space may be a colorimetric color space.

The method may further comprise appending the feature quantity to the image data as meta data to generate meta-image data.

According to one aspect of the invention, there is provided a method of analyzing image date, comprising:

receiving first image data described on the basis of a first color space;

acquiring color space converting information adapted to be used to convert the first image data into second image data described on the basis of a prescribed second color space;

extracting a prescribed first feature quantity defined in the first color space from the first image data; and converting the first feature quantity into a second feature quantity defined in the second color space, in accordance with the color space converting information.

The second color space may be a colorimetric color space.

The method may further comprising appending the second feature quantity to the image data as meta data to generate meta-image data.

According to one aspect of the invention, there is provided an apparatus operable to process image data, comprising:

a receiver, operable to receive first image data described on the basis of a first color space;

an acquirer, operable to acquire color space converting information adapted to be used to convert the first image data into second image data described on the basis of a prescribed second color space;

a converter, operable to convert the first image data into the second image data in accordance with the color space converting information; and an analyzer, operable to extract a prescribed feature quantity from the second image data.

The second color space may be a colorimetric color space.

The apparatus may further comprise an appender, operable to append the feature quantity to the image data as meta data to generate meta-image data.

According to one aspect of the invention, there is provided an apparatus operable to process image data, comprising:

a receiver, operable to receive first image data described on the basis of a first color space;

an acquirer, operable to acquire color space converting information adapted to be used to convert the first image data into second image data described on the basis of a prescribed second color space;

an analyzer, operable to extract a prescribed first feature quantity defined in the first color space from the first image data; and a converter, operable to convert the first feature quantity into a second feature quantity defined in the second color space, in accordance with the color space converting information.

The second color space may be a colorimetric color space.

The apparatus may further comprise an appender, operable to append the second feature quantity to the image data as meta data to generate meta-image data.

BRIEF DESCRIPTION OF THE DRAWINGS

FIG. 10 is a diagram showing a part of a dither matrix used in a halftoning in the image copy processing.

FIG. 13 is a diagram for explaining a modified example of the feature quantity extraction processing.

DETAILED DESCRIPTION OF EXEMPLARY EMBODIMENTS

Exemplary embodiments of the invention will be described below in detail with reference to the accompanying drawings.

Figure 1:
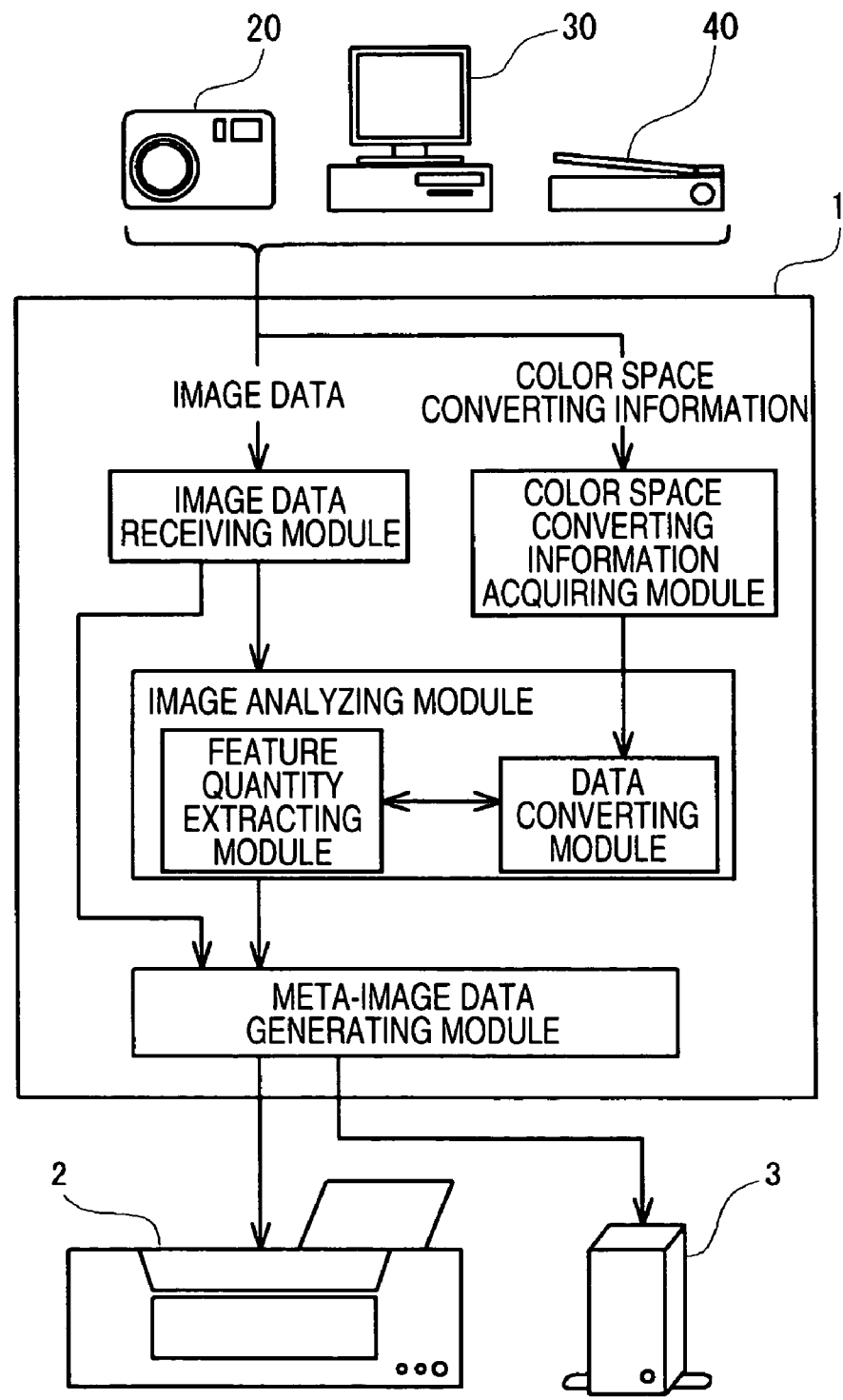
FIG. 1 is a schematic view showing an image data analyzer according to a first embodiment of the invention.

As shown in FIG. 1, an image data analyzer 1 according to a first embodiment of the invention receives image data from various imaging apparatuses such as a digital camera 20, a computer 30, a scanner 40 and the like, and analyzes image data so as to extract a feature quantity of an image. Various values can be extracted as the feature quantity of an image and, for example, the minimum grayscale value, the maximum grayscale value, the average value of grayscale values, the standard deviation, and the histogram of grayscale values can be extracted.

The obtained feature quantity is added to a header part of the image data, and supplied to an output apparatus of an image (for example, a printer 2) or stored in an image server 3 as meta-image data. When the image output apparatus such as the printer 2 or the like receives the meta-image data added with the feature quantity, the apparatus corrects the image data corresponding to the feature quantity so as to print a more preferable image. Further, in the image server 3, by searching an image based on the feature quantity, desired image data can be quickly find out from vast amounts of image data.

Recently, in order to obtain a more high-quality image, there is a tendency for a specific color space corresponding to the characteristic of each apparatus to be used in the imaging apparatus such as the digital camera 20, the scanner 40 and the like. A feature quantity of an image is obtained by analyzing image data. Thus, when the image data is expressed with a specific color space for every apparatus, the values of the feature quantities to be obtained are different. As a result of this, there are problems that an image cannot be properly corrected based on the feature quantity, and the desired image data cannot be searched from vast amounts of image data based on the feature quantity. In order to solve these problems, the image data analyzer 1 of this embodiment extracts the feature quantity of an image by the following process.

An image data receiving module receives image data from an imaging apparatus such as the digital camera 20, the computer 30, the scanner 40 or the like at first. Then, the image data is supplied to an image analyzing module and the feature quantity is extracted in the image analyzing module. In this case, "the module" is one in which a series of processing performing in the image data analyzer 1 for extracting the feature quantity are classified, based on the function. Therefore, "the module" can be realized as a part of a program, can be realized using a logic circuit including a specified function, and can be realized by combining the above-described two members.

Further, while the image data receiving module receives image data, a color space converting information acquiring module acquires color space converting information from the imaging apparatus such as the digital camera 20, the computer 30, the scanner 40 or the like. In this case, the color space converting information is to convert the data of a color space describing image data into the data of a color space being pre-set as a standard (a standard color space). As the color space converting information, a conversion formula or a so-called color profile may be adopted. Further, any color spaces can be used as the standard color space if having a fully wide color gamut and being used as standard. However, a colorimetric color space represented by the L*a*b* color space theoretically has an infinite wide color gamut, so that it is especially preferable.

In the image analyzing module, a feature quantity extracting module and a data converting module are provided. The feature quantity extracting module is to analyze image data so as to extract a feature quantity of an image. The data converting module is to convert the data of a color space describing image data into the data of the standard color space based on the color space converting information.

There may be adopted various ways for extracting a feature quantity in the image analyzing module. For example, the data converting module converts the image data supplied from the image data receiving module into the image data of a standard color space. Then, the feature quantity extracting module analyzes the converted the image data so as to extract a feature quantity. Thus, if the data converting module converts the image data into the image data of the standard color space in advance, the feature quantity of the standard color space can be extracted even when the image data is described by the specific color space in an imaging apparatus. On the other hand, after the feature quantity extracting module analyzes the image data supplied from the image data receiving module so as to extract a feature quantity, the data converting module converts the extracted feature quantity into the feature quantity of the standard color space. As a result, the feature quantity of the standard color space can be finally obtained.

A meta-image data generating module adds the obtained feature quantity of the standard color space to the image data received from the image data receiving module so as to generate meta-image data, and outputs the meta-image data to an image output apparatus such as the printer 2 or the image server 3. Thereby, when the image data received form the digital camera 20 or the computer 30 is described by any color space, the feature quantity of the image data is the feature quantity of the standard color space. Therefore, image data can be properly corrected based on the feature quantity, and desired image data can be quickly searched form vast amounts of image data based on the feature quantity.

In addition, FIG. 1 illustrates the case of adding the feature quantity to image data so as to output as meta-image data. However, the image data is not necessarily outputted as meta-image data, and a feature quantity and image data may be separately outputted. Further, in FIG. 1, the image data analyzer 1 is separated from the imaging apparatus such as the digital camera 20, the printer 2 and the image server 3. However, the image data analyzer 1 can be incorporated in the digital camera 20, the printer 2 or the image server 3.

Figure 2:
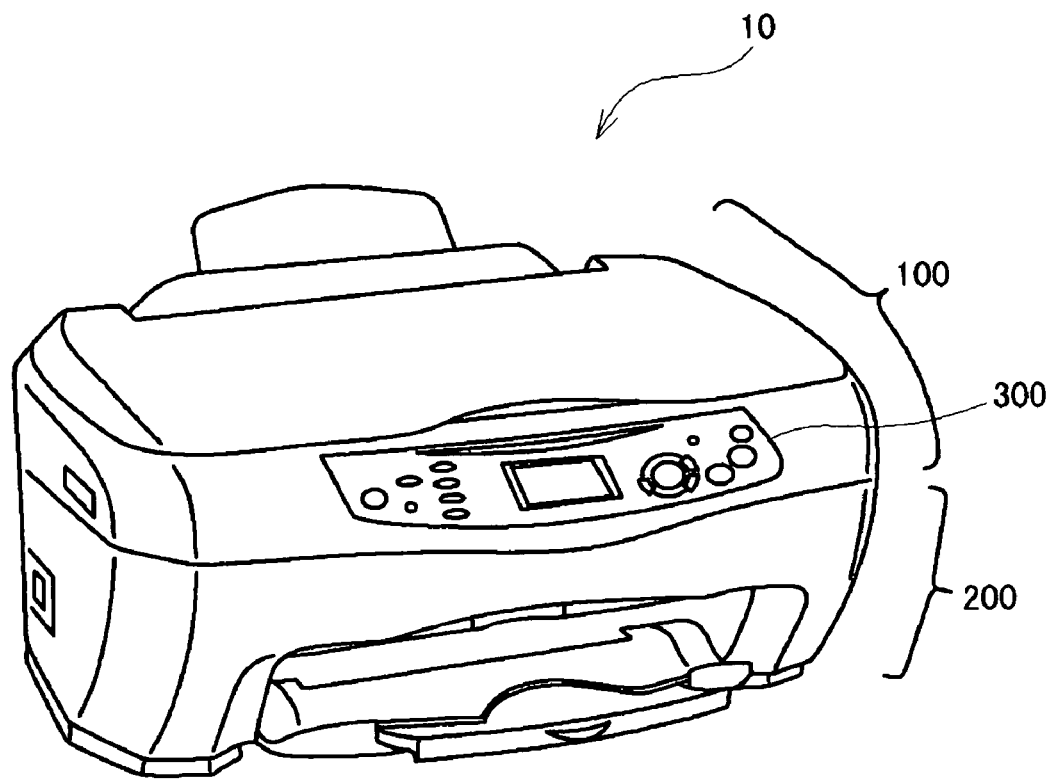
FIG. 2 is a perspective view showing an external appearance of the printing apparatus incorporating the image data analyzer.

As shown in FIG. 2, the printing apparatus 10 of this embodiment includes a scanner section 100, a printer section 200, and a control panel 300 that controls operations of the scanner section 100 and the printer section 200. The scanner section 100 has a scanner function of reading a printed image and generating image data. The printer section 200 has a printer function of receiving the image data and printing an image on a printing medium. Further, if an image (original image) read by the scanner section 100 is output from the printer section 200, a copier function can be realized. That is, the printing apparatus 10 of this embodiment is a so-called scanner/printer/copier hybrid apparatus (hereinafter, referred to as SPC hybrid apparatus) that can solely realize the scanner function, the printer function, and the copier function.

Figure 3:
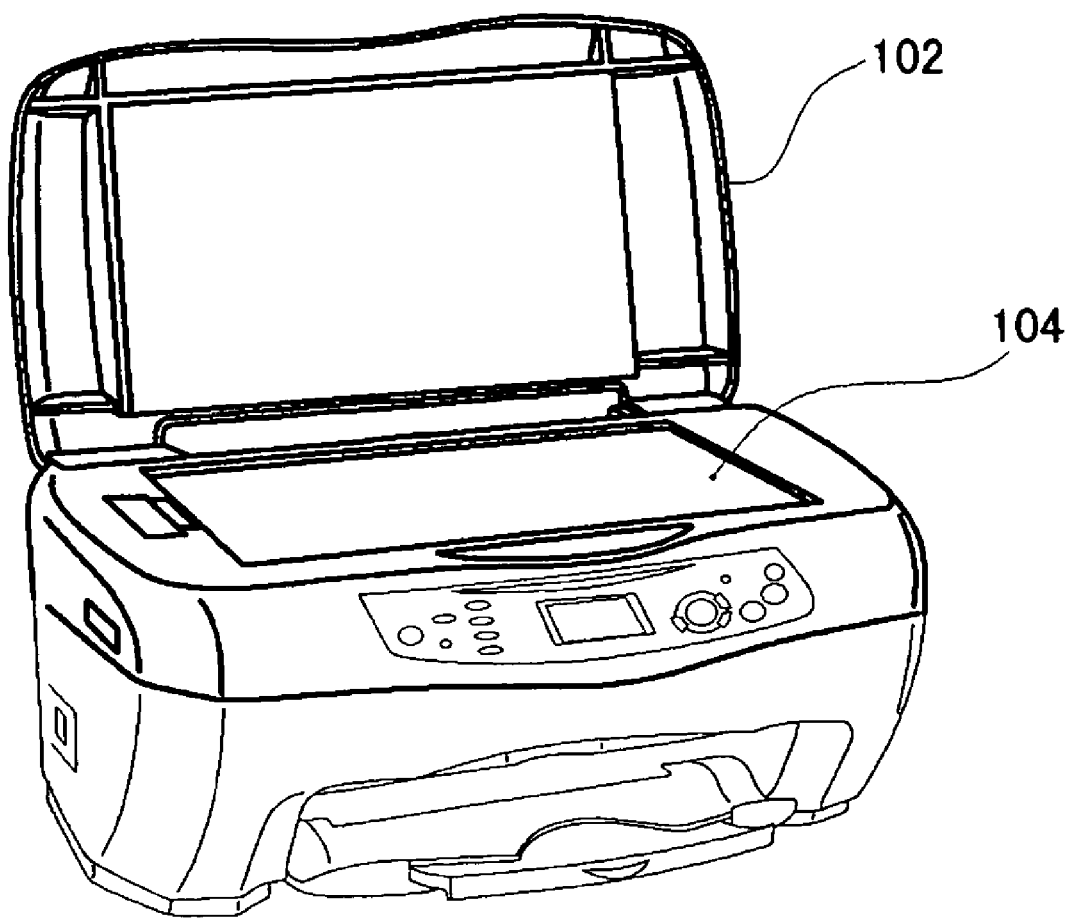
FIG. 3 is a perspective view showing a state that a table cover of the printing apparatus is opened.

As shown in FIG. 3, when a table cover 102 is opened upward, a transparent original table 104 is provided, and various mechanisms, which will be described below, for implementing the scanner function are mounted therein. When an original image is read, the table cover 102 is opened, and the original image is placed on the original table 104. Next, the table cover 102 is closed, and a button on the control panel 300 is operated. Then, the original image can be directly converted into image data.

Further, the entire scanner section 100 is housed in a case as a single body, and the scanner section 100 and the printer section 200 are coupled to each other by a hinge mechanism 204 (see FIG. 4) on a rear side of the printing apparatus 10. For this reason, only the scanner section 100 can rotate around the hinge when a front side of the scanner section 100 is lifted.

Figure 4:
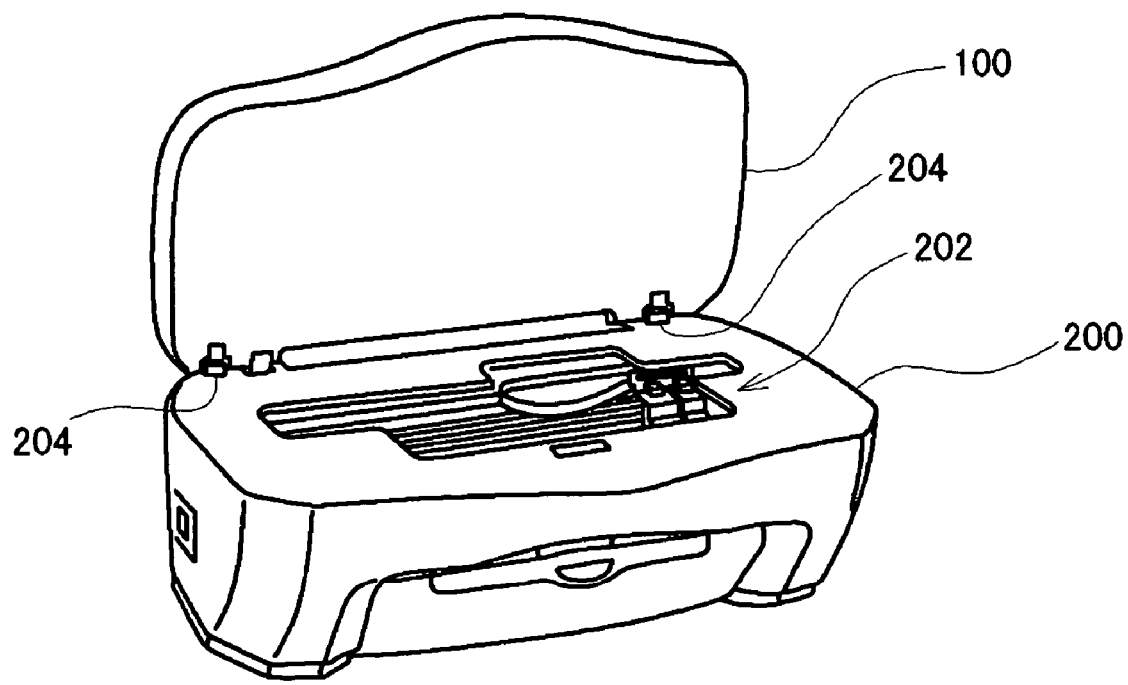
FIG. 4 is a perspective view showing a state that a scanner section of the printing apparatus is lifted up.

As shown in FIG. 4, in the printing apparatus 10 of this embodiment, when the front side of the scanner section 100 is lifted, the top face of the printer section 200 can be exposed. In the printer section 200, various mechanisms, which will be described below, for implementing the printer function, are provided. Further, in the printer section 200, a control circuit 260, which will be described below, for controlling the overall operation of the printing apparatus 10 including the scanner section 100, and a power supply circuit (not shown) for supplying power to the scanner section 100 or the printer section 200 are provided. In addition, as shown in FIG. 4, an opening portion 202 is provided on the upper face of the printer section 200, through which replacement of consumables such as ink cartridges, treatment of paper jam, and easy repair can be simply executed.

Figure 5:
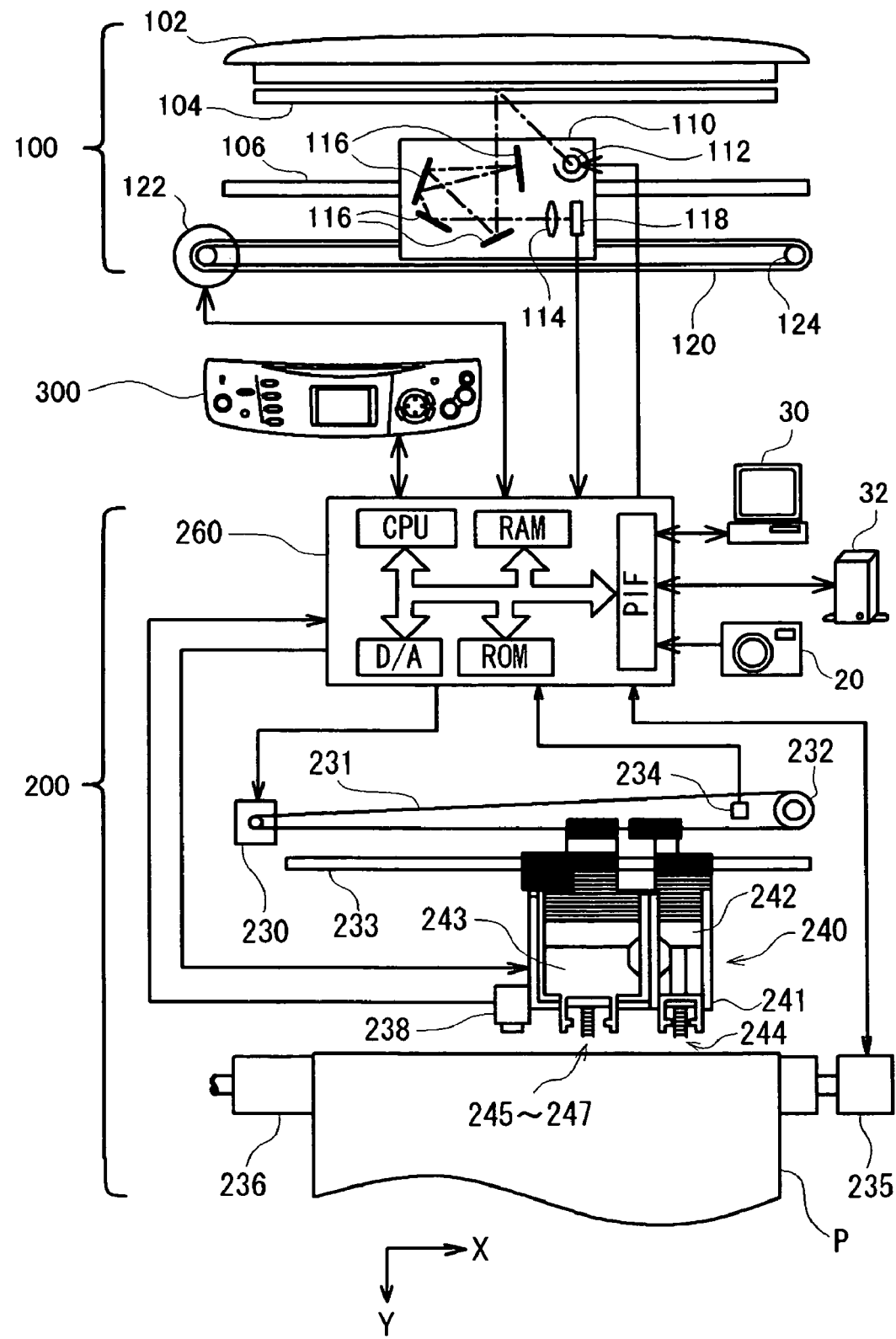
FIG. 5 is a schematic view showing an internal configuration of the printing apparatus.

Next, a description is given of the internal constructions of the scanner section 100 and the printer section 200 with reference to FIG. 5.

The scanner section 100 includes: the transparent original table 104 on which a printed original color image is set; a table cover 102 which presses a set original color image, a scanner carriage 110 for reading an original color image; a carriage belt 120 to move the scanner carriage 110 in the primary scanning direction X; a drive motor 122 to supply power to the carriage belt 120; and a guide shaft 106 to guide movements of the scanner carriage 110. In addition, operations of the drive motor 122 and the scanner carriage 110 are controlled by the control circuit 260 described later.

The scanner section 100 includes a transparent original table 104, on which a original image is set, a table cover 102 that presses the set original image, a reading carriage 110 that reads the set original image, a driving belt 120 that moves the reading carriage 110 in a reading direction (main scanning direction), a driving motor 122 that supplies power to the driving belt 120, and a guide shaft 106 that guides the movement of the reading carriage 110. Further, the operation of the driving motor 122 or the reading carriage 110 is controlled by a control circuit 260 described below.

As the drive motor 122 is rotated under control of the control circuit 260, the motion thereof is transmitted to the scanner carriage 110 via the carriage belt 120. As a result, the scanner carriage 110 is moved in the primary scanning direction X in response to the turning angle of the drive motor 122 while being guided by the guide shaft 106. Also, the carriage belt 120 is adjusted in a state that proper tension is always given thereto by an idler pulley 124. Therefore, it becomes possible to move the scanner carriage 110 in the reverse direction by the distance responsive to the turning angle if the drive motor 122 is reversely rotated.

A light source 112, a lens 114, mirrors 116, and a CCD sensor 118 are incorporated in the interior of the scanner carriage 110. Light from the light source 112 is irradiated onto the original table 104 and is reflected from an original color image set on the original table 104. The reflected light is guided to the lens 114 by the mirror 116, is condensed by the lens 114 and is detected by the CCD sensor 118. The CCD 118 is composed of a linear sensor in which photo diodes for converting the light intensity to electric signals are arrayed in the direction orthogonal to the primary scanning direction X of the scanner carriage 110. For this reason, while moving the scanner carriage 110 in the primary scanning direction X, light of the light source 112 is irradiated onto an original color image, and the intensity of the reflected light is detected by the CCD sensor 118, whereby it is possible to obtain electric signals corresponding to the original color image.

Further, the light source 112 is composed of light emitting diodes of three colors of RGB, which is able to irradiate light of R color, G color and B color at a predetermined cycle by turns. In response thereto, reflected light of R color, G color and B color can be detected by the CCD sensor 118 by turns. Generally, although red portions of the image reflect light of R color, light of G color and B color is hardly reflected. Therefore, the reflected light of R color expresses the R component of the image. Similarly, the reflected light of G color expresses the G component of the image, and the reflected light of B color expresses the B component of the image. Accordingly, light of three colors of RGB is irradiated onto an original color image while being changed at a predetermined cycle. If the intensities of the reflected light are detected by the CCD sensor 118 in synchronization therewith, it is possible to detect the R component, G component, and B component of the original color image, wherein the color image can be read addition, since the scanner carriage 110 is moving while the light source 112 is changing the colors of light to be irradiated, strictly speaking, the position of an image for which the respective components of RGB are detected will differ corresponding to the amount of movement of the scanner carriage 110. However, the difference can be corrected by an image processing after the respective components are read.

The printer section 200 is provided with the control circuit 260 for controlling the operations of the entirety of the printing apparatus 10, a printer carriage 240 for printing images on a printing medium P, a mechanism for moving the printer carriage 240 in the primary scanning direction X and a mechanism for feeding the printing medium P.

The printer carriage 240 is composed of an ink cartridge 242 for accommodating K ink, an ink cartridge 243 for accommodating various types of ink of C ink, M ink, and Y ink, and a head unit 241 secured on the bottom face. The head unit 241 is provided with an head for ejecting ink droplets per ink. If the ink cartridges 242 and 243 are mounted in the printer carriage 240, respective ink in the cartridges are supplied to the printing heads 244 through 247 of respective ink through a conduit (not illustrated).

The mechanism for moving the printer carriage 240 in the primary scanning direction X is composed of a carriage belt 231 for driving the printer carriage 240, a carriage motor 230 for supplying power to the carriage belt 231, a tension pulley 232 for applying proper tension to the carriage belt 231 at all times, a carriage guide 233 for guiding movements of the printer carriage 240, and a reference position sensor 234 for detecting the reference position of the printer carriage 240. If the carriage motor 230 is rotated under control of a control circuit 260 described later, the printer carriage 240 can be moved in the primary scanning direction X by the distance responsive to the turning angle. Further, if the carriage motor 230 is reversed, it is possible to cause the printer carriage 240 to move in the reverse direction.

The mechanism for feeding a printing medium P is composed of a platen 236 for supporting the printing medium P from the backside and a medium feeding motor 235 for feeding paper by rotating the platen 236. If the medium feeding motor 235 is rotated under control of a control circuit 260 described later, it is possible to feed the printing medium P in a secondary scanning direction Y by the distance responsive to the turning angle.

The control circuit 260 is composed of a ROM, a RAM, a D/A converter for converting digital data to analog signals, and further an interface PIF for peripheral devices for communications of data between the CPU and the peripheral devices, including the CPU. The control circuit 260 controls operations of the entirety of the printing apparatus 10 and controls these operations through communications of data between the light source 112, the drive motor 122 and the CCD 118, which are incorporated in the scanner section 100. Further, the control circuit 260 performs a processing for analyzing image data so as to extract a feature quantity, and a processing for correcting the image data corresponding to the feature quantity.

In addition, the control circuit 260 controls supplying drive signals to the printing heads 244 through 247 of respective colors and ejecting ink droplets while causing the printer carriage 240 to be subjected to primary scanning and secondary scanning by driving the carriage motor 230 and the medium feeding motor 235, in order to form an image on a printing medium P. The drive signals supplied to the printing heads 244 through 247 are generated by reading image data from a computer 30 and a digital camera 20, and executing an image processing described later. As a matter of course, by applying an image processing to the RGB image data read by the scanner section 100, it is possible to generate the drive signals. Thus, under the control of the control circuit 260, ink dots of respective colors are formed on a printing medium P by ejecting ink droplets from the printing heads 244 through 247 while causing the printer carriage 240 to be subjected to the primary scanning and secondary scanning, whereby it becomes possible to print a color image. As a matter of course, instead of executing an image processing for forming the image in the control circuit 260, it is possible to drive the printing heads 244 through 247 by receiving data, which has been subjected to image processing in advance, from the computer 30 while causing the printer carriage 240 to be subjected to the primary scanning and secondary scanning in compliance with the data.

Also, the control circuit 260 is connected so as to receive data from and transmit the same to the control panel 300, wherein by operating respective types of buttons secured on the control panel 300, it is possible to set detailed operation modes of the scanner function and the printer function. Furthermore, it is also possible to set detailed operation modes from the computer via the interface PIF for peripheral devices.

Figure 6:
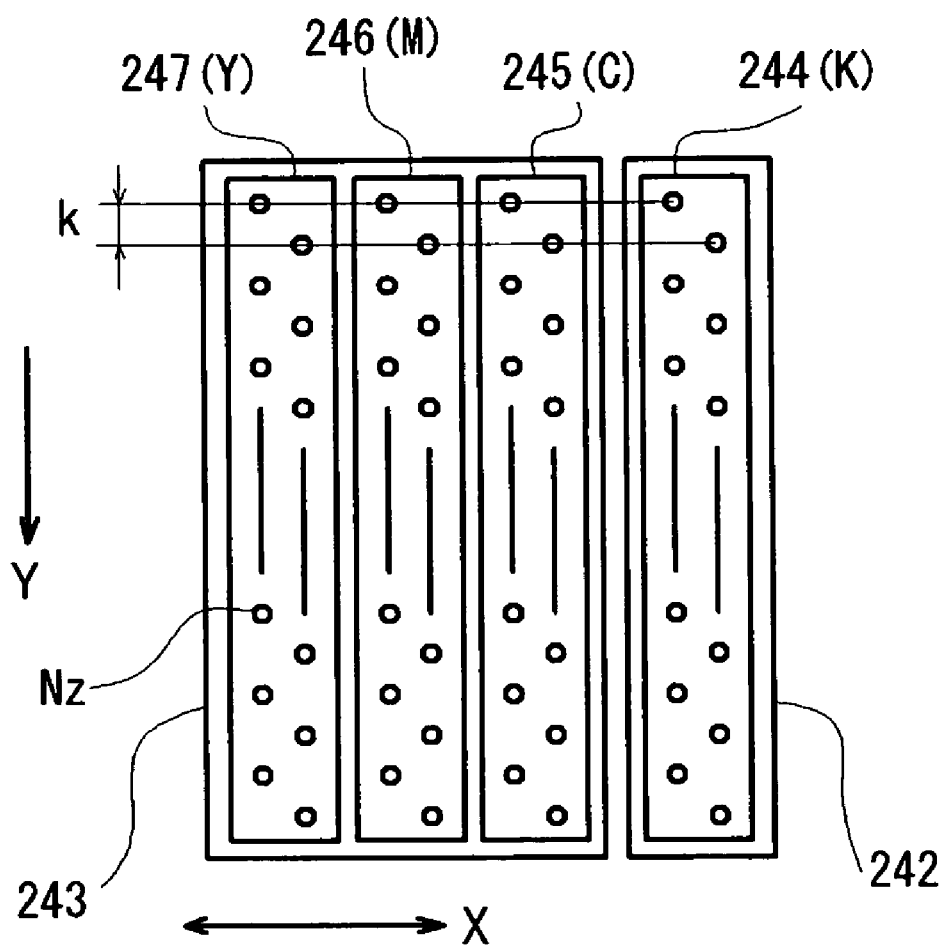
FIG. 6 is a schematic view showing nozzles of printing heads in a printer section of the printing apparatus.

As shown in FIG. 6, a plurality of nozzles Nz for ejecting ink droplets are formed on the printing heads 244 through 247 of respective colors. As shown, four sets of nozzle arrays which eject ink droplets of respective colors are formed on the bottom face of the printing heads of respective colors. In one set of the nozzle arrays, 48 nozzles Nz are arrayed in a zigzag manner with a pitch k. Drive signals are supplied from the control circuit 260 to the respective nozzles Nz, and the respective nozzles Nz eject drops of respective ink in compliance with the drive signals.

There may be adopted various ways for ejecting the ink droplets from the ink ejection head. For example, a piezoelectric element may be used so as to eject ink, and a heater may be provided at an ink passage and generating bubbles in the ink passage so as to eject ink. Further, a phenomenon such as thermal transfer or the like may be utilized so as to form an ink dot on a printing paper, and a static electricity may be utilized so as to adhere toner powders in each color on a printing medium.

In the above-described printing apparatus 10, when image data is received from the digital camera 20 or the like or the scanner section 100 reads an original image so as to generate image data, the control circuit 260 extracts the feature quantity of an image and the image is corrected corresponding to the feature quantity and printed. Further, when the feature quantity is extracted, the image data is extracted not depending on a color space of the image data. Thus, the image data described by any color space can be properly corrected corresponding to the feature quantity. Hereinafter, a processing for receiving image data so as to print an image (an image print processing) will be briefly described, and then, a processing for extracting a feature quantity of an image during the image print processing (a feature quantity extraction processing) will be concretely described.

Figure 7:
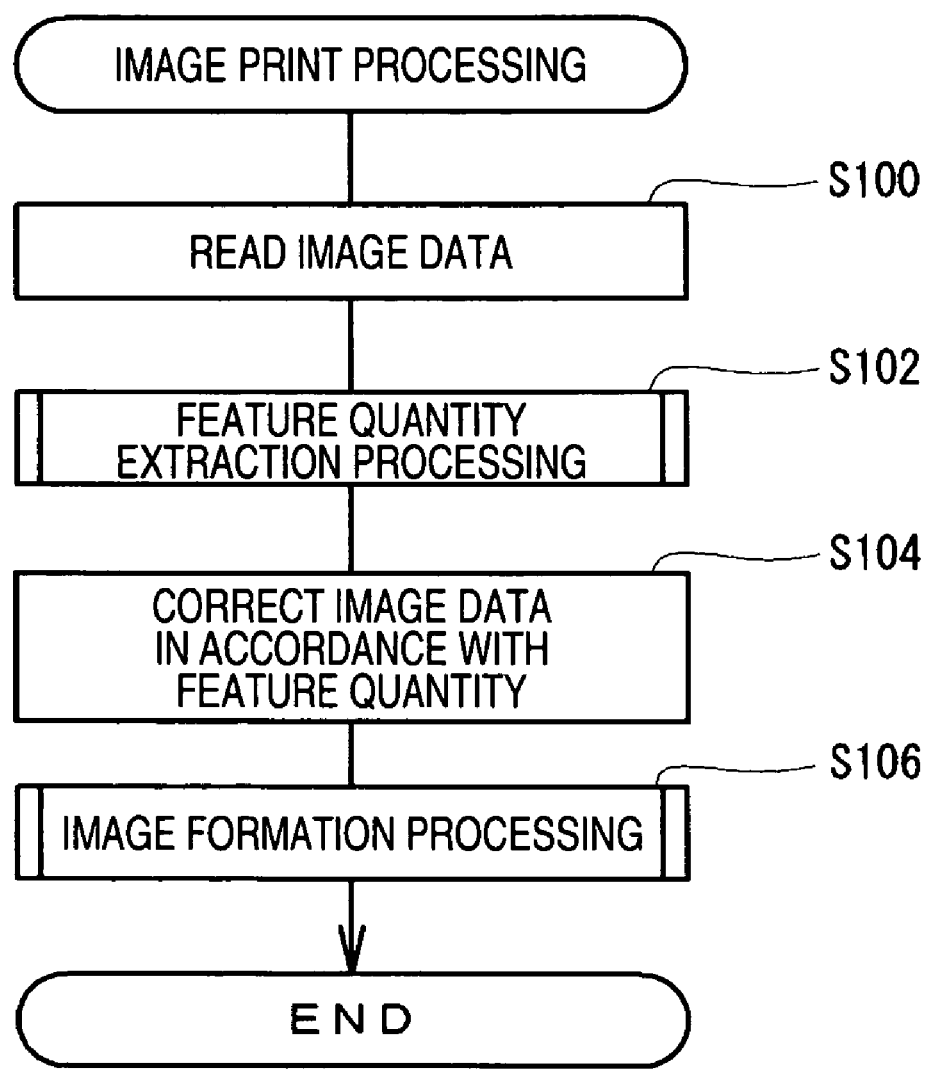
FIG. 7 is a flowchart showing an image print processing executed in the printing apparatus.

FIG. 7 shows the image print processing that is performed by the printing apparatus 10 in order to print an image. This processing is performed by the control circuit 260 mounted on the printing apparatus 10 using the internal CPU, RAM, or ROM. Hereinafter, the description will be given on the basis of the flowchart.

When an image is printed, a processing for reading image data of an image to be printed is performed at first (step S100). As the image data, image data corresponding to an image captured by the digital camera 20, image data created by various application programs working on the computer 30, and image data corresponding to an image scanned by the scanner section 100 can be used. Further, in this embodiment each of these image data is RGB image data expressed by a grayscale value in each color of R, G and B. However, RGB image data has various specifications of a color space such as an sRGB color space. So, when the image data is read, information for converting the color space of RGB image data into a colorimetric color space (the L*a*b* color space) is acquired in addition to RGB image data. In addition, this embodiment describes the color space of RGB image data to be converted into the colorimetric color space. However, any color space can be used instead of the colorimetric color space if having a sufficiently wide color gamut and being widely used as standard.

Then, the read image is analyzed so as to perform a processing for extracting a specified feature quantity from the image (step S102). The detail of the feature quantity extraction processing will be concretely described. However, a processing for extracting the feature quantity of the colorimetric color space is performed irrespective of whether the image data is described by any color space.

Based on the extracted feature quantity, the image data received from the digital camera 20, the computer 30 or the like is corrected (step S104). Since various means are publicly known as a process for correcting image data based on the feature quantity, detailed descriptions are omitted. However, this embodiment obtains the feature quantity of the colorimetric color space irrespective of the kind of the color space of the image data. Therefore, since all image data can be collectively handled according the same standard, those can be properly corrected.

An image formation processing described below is performed with respect to the corrected image data, so as to form an image on a printing medium (step S106).

This processing can be executed by the control circuit 260 in the above-described image print processing, and the control circuit 260 executes this processing to the image data corrected corresponding to the feature quantity.

Figure 8:
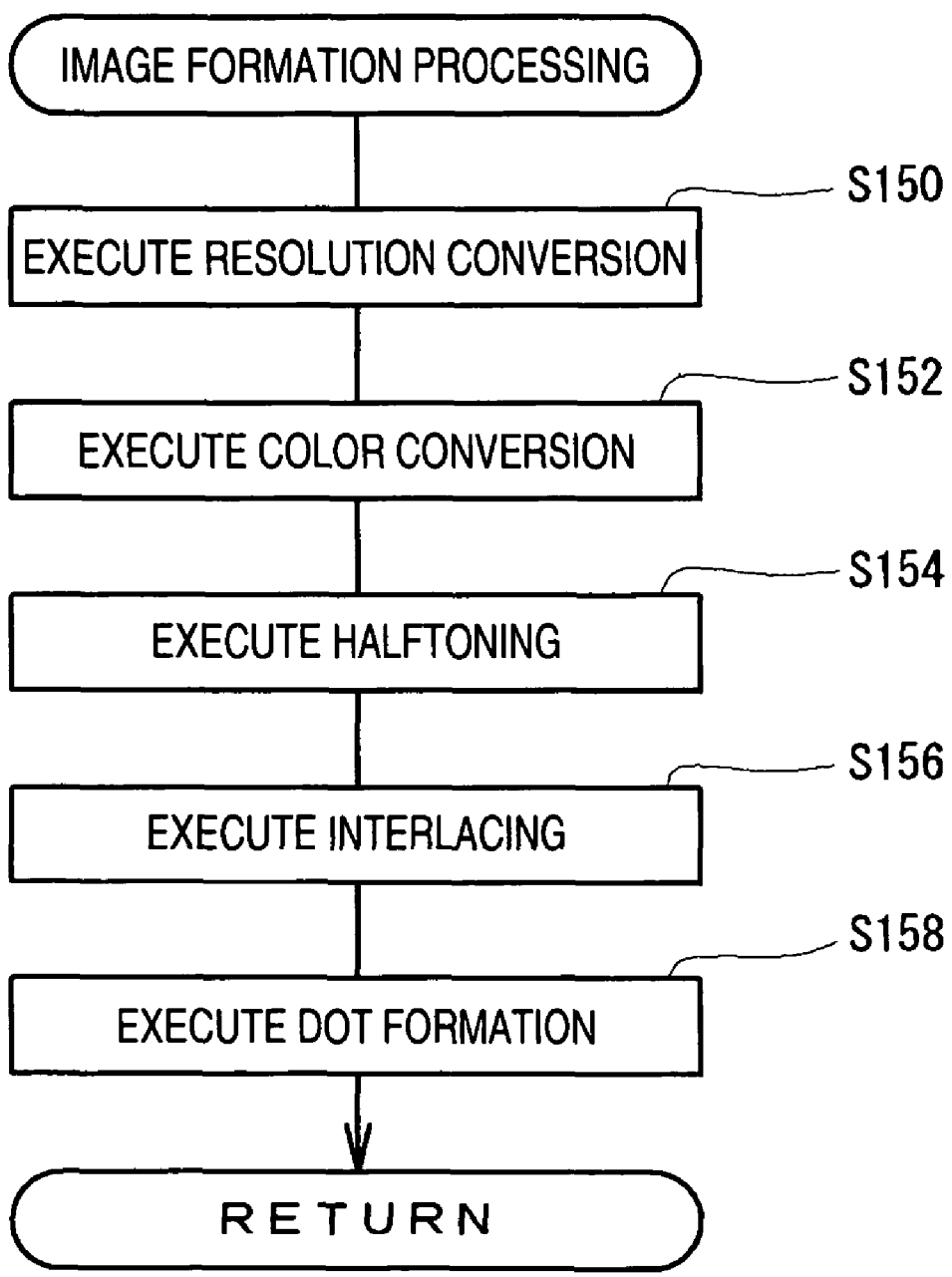
FIG. 8 is a flowchart specifically showing an image formation processing in the image print processing.

As shown in FIG. 8, the control circuit 260 first executes a processing for converting a resolution of the read image data into a resolution to be printed by the printer section 200 (printing resolution) is performed (Step S150). When the resolution of the read image data is lower than the printing resolution, an interpolation operation is performed between adjacent pixels and new image data is set, such that the resolution of the read image data is converted into a higher resolution. In contrast, when the resolution of the read image data is higher than the printing resolution, image data is thinned out from adjacent pixels at a prescribed ratio, such that the resolution of the read image data is converted into a lower resolution. In the resolution conversion processing, the processing for converting the read resolution into the printing resolution by generating or thinning out image data from the read image data at an appropriate ratio is performed.

After the resolution of the image data is converted into the printing resolution in such a manner, the control circuit 260 performs a color conversion processing (Step S152). Here, the color conversion processing converts the image data represented by the individual colors R, G, and B into image data represented by grayscale values of individual colors C, M, Y, and K. The color conversion processing is performed with reference to a three-dimensional numeric table, which is called a color conversion table (LUT).

Figure 9:
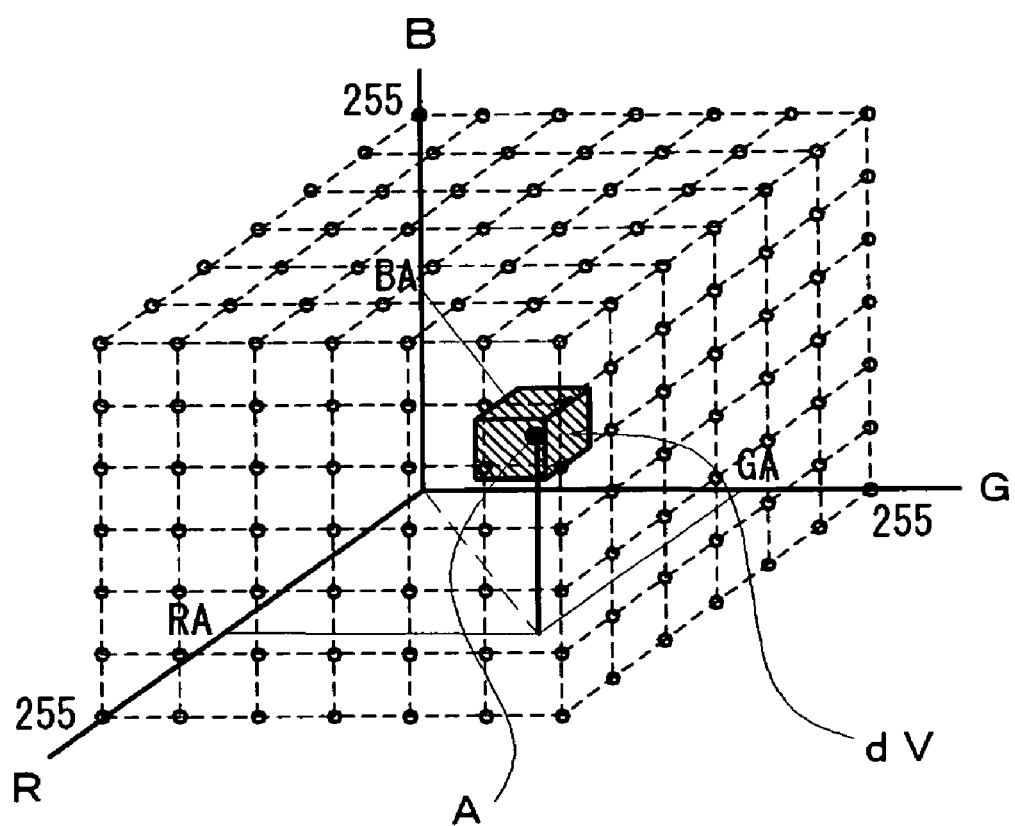
FIG. 9 is a diagram for explaining a color conversion table used in a color conversion processing in the image copy processing.

Now, an RGB color space is taken into account, in which grayscale values of respective colors of R, G and B are taken in three axes orthogonal to each other as shown in FIG. 9, and it is assumed that the grayscale values of respective colors of RGB take values from 0 through 255. If so, all the RGB image data can be associated with an internal point of a cube (color solid), the original point of which is the top and the length of one side of which is 255. Therefore, changing the view point, if a plurality of lattice points are generated in the RGB color space by fragmenting the color solid in the form of a lattice orthogonal to the respective axes of RGB, it is considered that respective lattice points correspond to the RGB image data respectively. Therefore, combinations of grayscale values corresponding to the use amounts of ink of respective colors of C, M, Y and K are stored in advance in the respective lattice points. Thereby, the RGB image data can be quickly converted to image data corresponding to the use amounts of respective colors of ink (CMYK image data) by reading the grayscale values stored in the lattice points.

For example, if it is assumed that the R component of the image data is RA, the G component thereof is GA and the B component thereof is BA, the image data are associated with the point A in the RGB color space. Therefore, a cube dV having the point A included therein is detected from minute cubes which is fragmented from the color solid, the grayscale values of respective colors of ink, which are stored in the respective lattice points of the cube dV, are read. And, it is possible to obtain the grayscale value of the point A by executing an interpolation calculation based on the grayscale values the respective lattice points. As described above, it can be considered that the look-up table (LUT) is a three-dimensional numerical table in which combinations of grayscale values corresponding to the use amounts of ink of respective colors of C, M, Y and K are stored in a plurality of lattice points established in the RGB color space. And, by referencing the look-up table, it is possible to quickly convert the RGB image data in terms of color.

After the color conversion processing is terminated as described above, a halftoning is executed in the image copy processing shown in FIG. 8 (Step S154). The gradation data corresponding to the use amounts of ink of respective colors of CMYK obtained by the color conversion processing are data which can take a value from the grayscale value 0 through the grayscale value 255 per pixel. To the contrary, in the printer section 200, the printer section takes only a status on whether or not a dot is formed, with attention directed to individual pixels since the printer section 200 prints an image by forming dots. Therefore, it is necessary to convert the CMYK gradation data having 256 gradations to data (dot data) showing whether or not a dot is formed per pixel. The halftoning is a processing for converting the CMYK gradation data to dot data.

As a method for executing the halftoning, various types of methods such as an error diffusion method and a dither method may be employed. The error diffusion method diffuses the error in gradation expression generated in a certain pixel, by judging whether or not dots are formed in regard to the pixel, to the peripheral pixels, and at the same time, judges whether or not dots are formed in regard to respective pixels, so that the error diffused from the periphery can be dissolved. Also, the dither method compares the threshold values set at random in a dither matrix with the CMYK gradation data per pixel, and, for pixels in which the CMYK gradation data are greater, judges that dots are formed, and for pixels in which the threshold value is greater, judges that no dot is formed, thereby obtaining dot data for the respective pixels.

FIG. 10 shows a part of the dither matrix. In the illustrated matrix, threshold values universally selected from the range of the grayscale values 0 through 255 are stored at random in 4096 pixels consisting of 64 pixels disposed in both the vertical and horizontal directions. Herein, the reason why the grayscale values of the threshold values are selected in the range of 0 through 255 corresponds to that the CMYK image data is of 1 byte in the embodiment, and the grayscale value takes a value from 0 through 255. In addition, the size of the dither matrix is not limited to 64 pixels in both the vertical and horizontal directions as shown in FIG. 10, but may be set to various sizes including a case in which the number of pixels differs in the vertical and horizontal directions.

Figure 11:
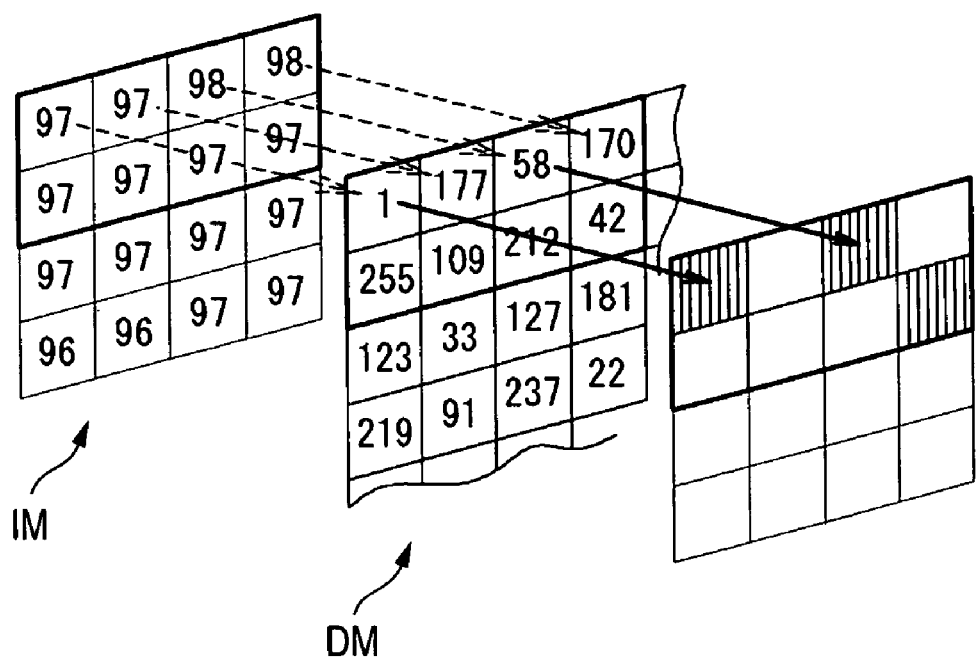
FIG. 11 is a diagram showing how to judge whether dots are formed for each pixel with reference to the dither matrix.

FIG. 11 shows how to judge whether or not dots are formed per pixel with reference to the dither matrix. Such judgment is made for respective colors of CMYK. However, hereinafter, to avoid complicated description, the CMYK image data are handled merely as image data without distinguishing respective colors of the CMYK image data.

When judging whether or not dots are formed, first, the grayscale value of the image data IM for a pixel to which attention is focused as an object to be judged (pixel of interest) is compared with the threshold value stored in the corresponding position in the dither matrix DM. The arrow of a dashed line, which is shown in the drawing, schematically expresses that the image data of the noted pixel are compared with the threshold value stored in the corresponding position in the dither matrix. Where the image data of the noted image is greater than the threshold value of the dither matrix, it is judged that a dot is formed for the pixel. To the contrary, where the threshold value of the dither matrix is greater than the other, it is judged that no dot is formed for the pixel. In the example shown in FIG. 11, the image data of the pixel located at the left upper corner of the image is "97", and the threshold value stored in the position corresponding to the pixel in the dither matrix is "1". Therefore, since, on the pixel located at the left upper corner, the image data are greater than the threshold value of the dither matrix, it is judged that a dot is formed for the pixel. The arrow of a solid line shown in the FIG. 11 schematically expresses the state that the result of judgment is written in a memory upon judging that a dot is formed.

On the other hand, in regard to a pixel adjacent to this pixel at the right side, the image data are "97", and the threshold value of the dither matrix is "177", wherein the threshold value is greater than the other. Therefore, it is judged that no dot is formed. Thus, by comparing the image data with the threshold value set in the dither matrix, it is possible to determine, at respective pixels, whether or not dots are formed. In the halftoning (Step S154 in FIG. 8), the above-described dither method is applied to the gradation data corresponding to the use amounts of respective ink of C, M, Y and K, whereby the processing of generating dot data is executed while judging, for each of the pixels, whether or not dots are formed.

After the gradation data of the respective colors of CMYK are converted to dot data, an interlacing is executed (Step S156). The interlacing rearranges the dot data in the order along which the head unit 241 forms dots, and supplies the data to the printing heads 244 through 247 of the respective colors. That is, as shown in FIG. 6, since the nozzles Nz secured at the printing heads 244 through 247 are provided in the secondary scanning direction Y with the interval of nozzle pitch k spaced from each other, if ink drops are ejected while causing the printer carriage 240 to be subjected to primary scanning, dots are formed with the interval of nozzle pitch k spaced from each other in the secondary scanning direction Y. Therefore, in order to form dots in all the pixels, it is necessary that the relative position between the head 240 and a printing medium P is moved in the secondary scanning direction Y, and new dots are formed at pixels between the dots spaced only by the nozzle pitch k. As has been made clear from this, when actually printing an image, dots are not formed in the order from the pixels located upward on the image. Further, in regard to the pixels located in the same row in the primary scanning direction X, dots are not formed by one time of primary scanning, but dots are formed through a plurality of times of primary scanning based on the demand of the image quality, wherein it is widely executed that dots are formed at pixels in skipped positions in respective times of primary scanning.

Thus, in a case of actually printing an image, since it does not mean that dots are formed in the order of arrangement of pixels on the image, before actually commencing formation of dots, it becomes necessary that the dot data obtained for each of the colors of C, M, Y and K are rearranged in the order along which the printing heads 244 through 247 form the same. Such a processing is called an "interlacing."

After the interlacing is completed, a processing of actually forming dots on a printing medium P (dot formation) is executed by the control circuit 260 based on the data obtained by the interlacing (Step S158). That is, while causing the printer carriage 240 to be subjected to primary scanning by driving the carriage motor 230, the dot data (printing control data) whose order has been rearranged are supplied to the printing heads 244 through 247. As a result, the ink droplets are ejected from the ink ejection heads 244 through 247 according to the dot data indicative of whether a dot is formed in each pixel, so that the dots are appropriately formed at each pixel.

After one time of primary scanning is completed, the printing medium P is fed in the secondary scanning direction Y by driving the medium feeding motor 235. After that, again, the dot data (printing control data) whose order has been rearranged are supplied to the printing heads 244 through 247 to form dots while causing the printer carriage 240 to be subjected to primary scanning by driving the carriage motor 230. By repeating such operations, dots of respective colors of C, M, Y and K are formed on the printing medium P at a proper distribution responsive to the grayscale values of the image data. As a result, the image is printed.

As described above, by forming ink dots on the printing medium with proper density based on image data corrected in advance on the basis of feature quantity, the image is printed. Further, upon correcting the image data, correction is performed based on feature quantity in the colorimetric color space not the feature quantity obtained in the color space of image data. Therefore, even though the color spaces in which image data is described are different, the whole image data can be collectively handled according to same reference, so that it is possible to correct properly. Hereinafter, processing performed for extracting the feature quantity in the colorimetric color space (feature quantity extraction processing) will be explained in detail.

In this embodiment, such processing is also carried out in the control circuit 260 of the printing apparatus 10.

Figure 12:
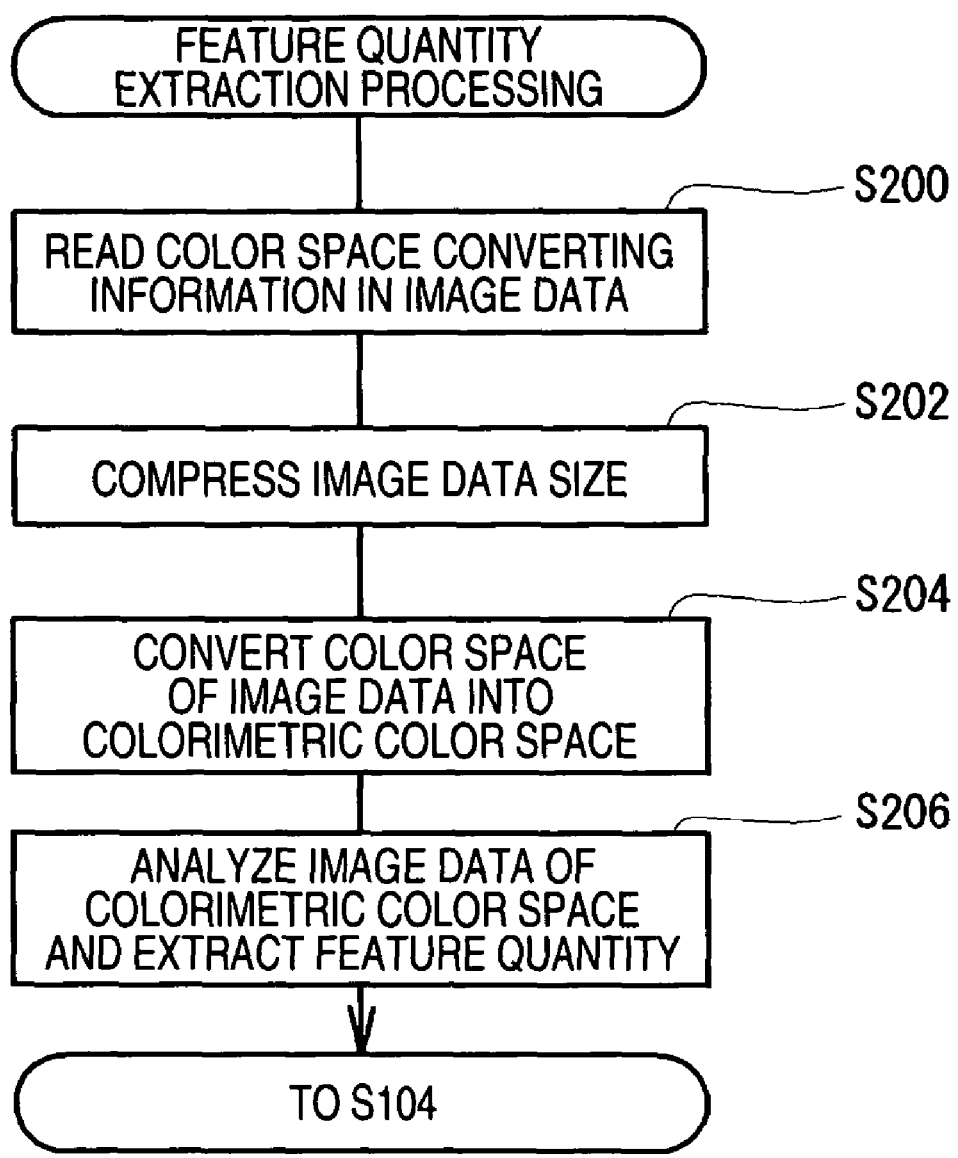
FIG. 12 is a flowchart specifically showing a feature quantity extraction processing in the image print processing.

As shown in FIG. 12, at first, processing for reading color space converting information of the image data is performed (step S200). Here, the color space converting information is information for converting data of the color space employed in an apparatus for generating image data such as the digital camera 20 into data of a standard color space (here, colorimetric color space) set as a standard in advance. The color space converting information may include information that can be received in a form of conversion formula, and information that can be received in a form of color profile. The color space converting information may be requested from the printing apparatus 10 with respect to the apparatus for generating image data such as the digital camera 20, or may be received together with the image data from the digital camera 20.

Next, a data size of the received image data is compressed (step S202). In such processing, by thinning pixels in the image with constant intervals, compression to the image data having relatively small pixel numbers such as 640×480 pixels or 320×240 pixels is preformed.

The compressed image data is converted into image data of a colorimetric color space according to the color space converting information read advance (step S204). As described above, the color space converting information is the information for converting data of the color space employed in an apparatus for generating image data into data of a standard color space set as a standard in advance, and is described directly in a form of conversion formula or conversion matrix, and moreover in a form of color profile. Of course, the color space converting information may be one that can specify indirectly the information described in the above-described forms, and for example may be information that designates corresponding one among plural conversion formulae stored in the printing apparatus 10 in advance. Further, in the feature quantity extraction processing of the present embodiment, since the data size of image data is compressed in advance, it is possible to convert quickly the image data into image data of the standard color space (here, L*a*b*colorimetric color space).

By analyzing the image data converted into the colorimetric color space, the feature quantity of image data is extracted (step S206). The feature quantity to be extracted may include various known feature quantities. For example, the minimum grayscale value, the maximum grayscale value, and the average value of grayscale values, the standard deviation of the image data, and histogram of the grayscale values or the like can be extracted. Otherwise, as shown in FIG. 13, by dividing the image area into plural regions, the feature quantity may be extracted for each region. As described above, the feature quantity is obtained, the feature quantity extraction processing shown in FIG. 12 is finished, and the process is returned to the image print processing in FIG. 7, and then the processing of S104 and subsequent steps is continued.

In this embodiment, the received image data is converted into image data of the colorimetric color space in advance and the image data of the colorimetric color space is analyzed to extract the feature quantity. The obtained feature quantity is a feature quantity obtained in the colorimetric color space even though the image data received from the imaging apparatus such as the digital camera 20 is image data of any color space. Therefore, it is possible to treat collectively the feature quantity extracted from each image data without being influenced from the difference of color space used in generation of the image data. The image data can be properly corrected according to the feature quantity to print high-quality image. Further, if the image data is stored in the server together with the obtained feature quantity, the feature quantity is data of the colorimetric color space even though the image data is different, so that it is possible to collectively search the whole image data and to quickly find desired image data from vast amounts of image data.

Figure 14:
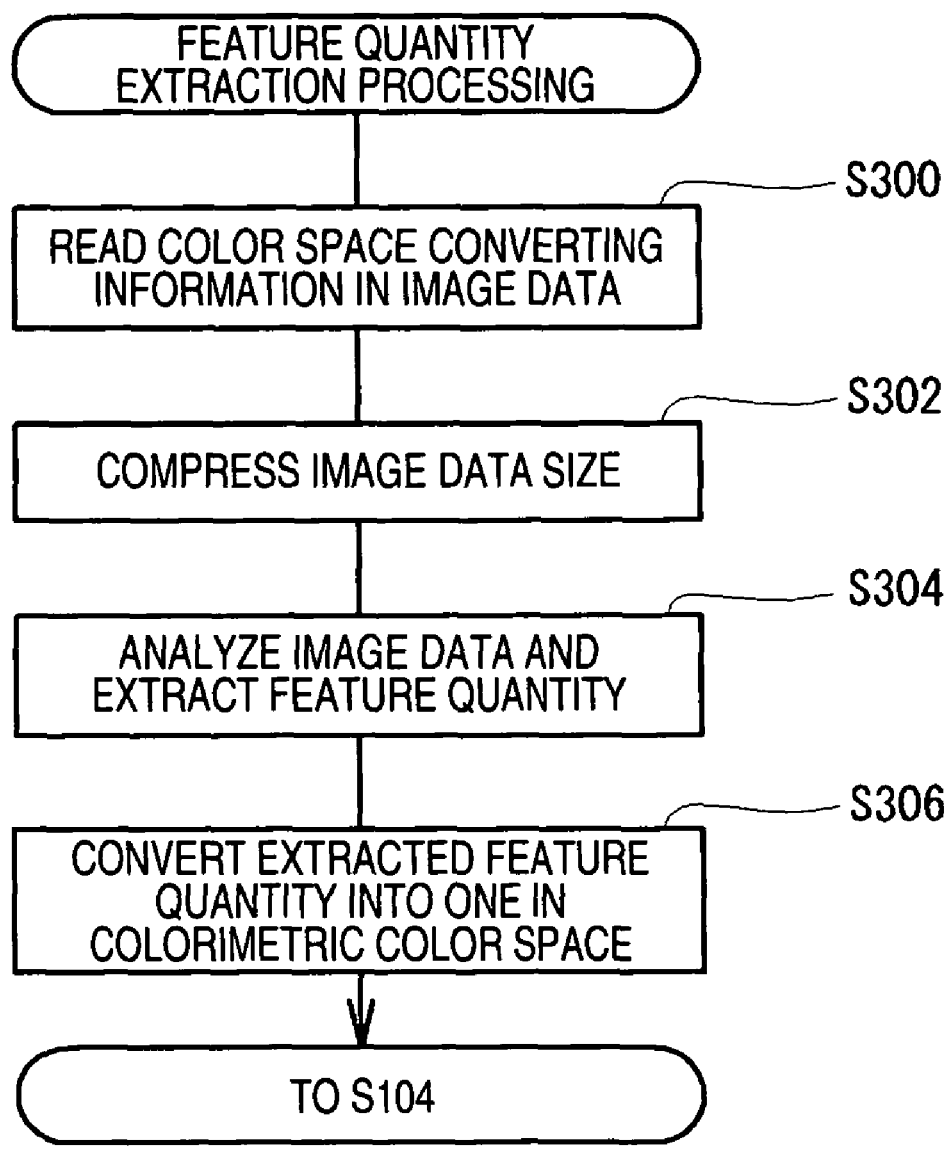
FIG. 14 is a flowchart specifically showing a feature quantity extraction processing performed in an image data analyzer according to a second embodiment of the invention.

In this embodiment, the image data received from the digital camera 20 and the like is converted into image data of colorimetric color space, and then the image data after conversion is analyzed to extract the feature quantity. However, it is also possible to extract feature quantity without converting color space of the received image data, and convert only the extracted feature quantity into data of the colorimetric color space. Such a processing will be described below as a second embodiment of the invention with reference to FIG. 14.

The second embodiment is mainly different from the processing of the first embodiment shown in FIG. 12 in that the feature quantity is extracted and then conversion of the color space is performed. This point will be mainly explained below.

When the feature quantity extraction processing of the second embodiment starts, similar to the case of the above-described first embodiment, at first, color space information of image data is read (step S300), and then processing for compressing a data size of the image data that has been read (step 302).

In the second embodiment, when the image data is compressed, the image data is immediately analyzed to extract the feature quantity (step S304). The image data to be analyzed has the compressed size, but the color space is in a state received from the digital camera 20 and the like, so that the feature quantity to be extracted is obtained as data of the color space of image data. Accordingly, the obtained feature quantity cannot be treated collectively for the image data generated in different color space.

Further, when the feature quantity is extracted, it is converted into the feature quantity of the colorimetric color space (step S306). The color space converting information for converting data of the color space in which image data is generated into data of the colorimetric color space is read advance in step S300, so that it is possible to convert the extracted feature quantity into the feature quantity of the colorimetric color space. As such, after the feature quantity of the colorimetric color space is obtained, the feature quantity extraction processing is finished and the process is returned to the image print processing in FIG. 7 to continue the processing of S104 and subsequent steps.

In the second embodiment, the feature quantity of the colorimetric color space is obtained like the first embodiment. So, when image data received from the imaging apparatus such as the digital camera 20 is described by any color space, the feature quantity can be collectively handled not being influenced by the difference of the color space.

Further, in the first embodiment, image data is once converted into a colorimetric color space so as to extract a feature quantity. On the other hand, in the second embodiment, image data is analyzed without being converted into a colorimetric color space, so as to extract a feature quantity, and only the obtained feature quantity is converted into data of a colorimetric color space. Thus, since a processing for entirely converting image data to a colorimetric color space is not necessary, the processing speed can be increased.

On the other hand, in the first embodiment, since the whole image data is converted into a colorimetric color space and analyzed, the data can be analyzed in detail, and a high-quality feature quantity can be extracted.

In the above embodiments, the image data analyzer is incorporated in the printing apparatus 10, and when image data is received from the imaging apparatus such as the digital camera 20 or the like, the feature quantity of the colorimetric color space is extracted so as to print the image. However, the image data analyzer can be incorporated in an apparatus for generating image data, such as the digital camera 20, the scanner 40 and the like, so as to generate the image data as meta-image data added with a feature quantity. Hereinafter, such a case will be described as a third embodiment of the invention with reference to FIGS. 15 and 16.

Figure 15:
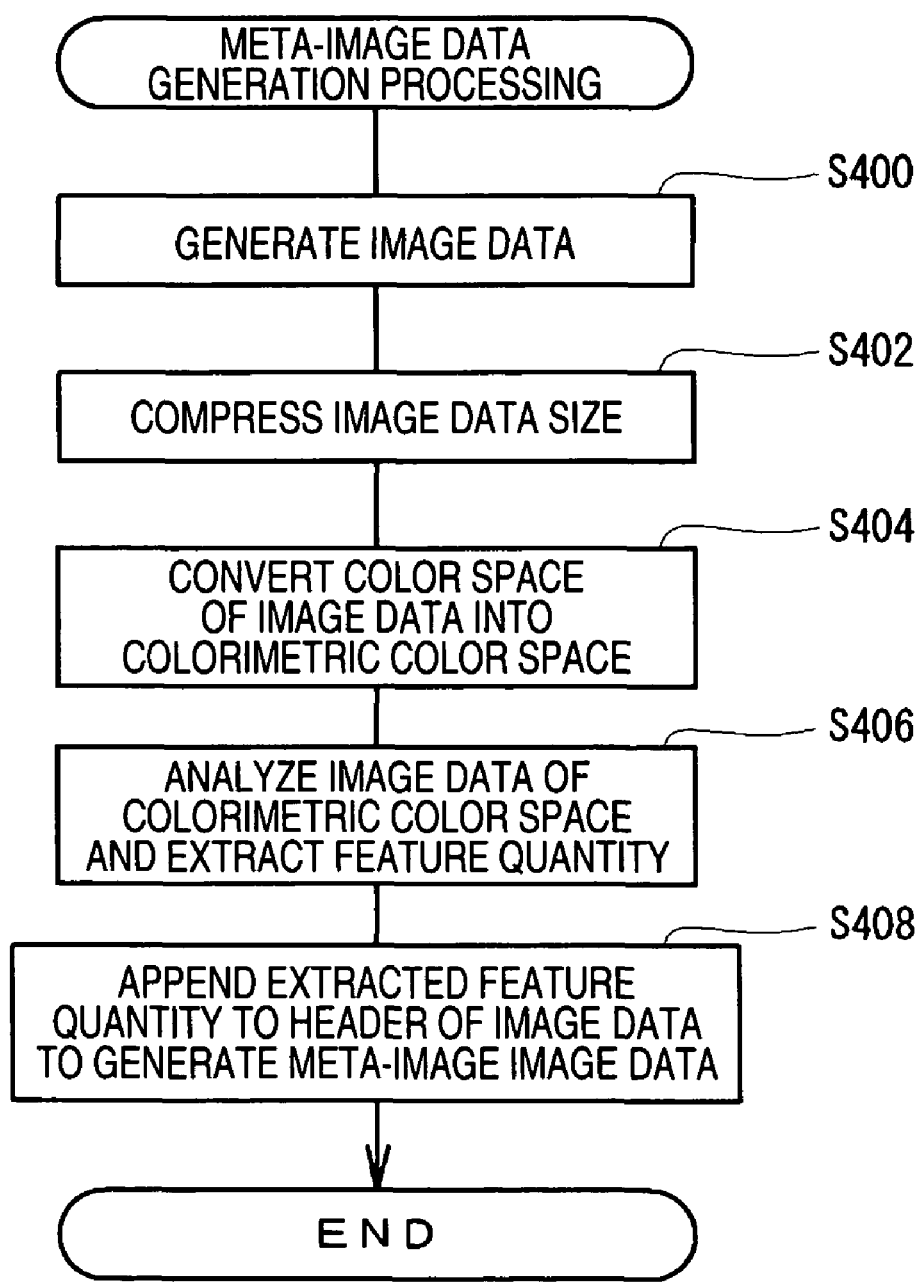
FIG. 15 is a flowchart showing a meta-image data generation processing performed in an image data analyzer according to a third embodiment of the invention.

FIG. 15 shows a processing for generating meta-image data. This processing is performed in an imaging apparatus for generating image data such as the digital camera 20, the computer 30, the scanner 40 or the like. Hereinafter, a processing for generating meta-image data will be described according to the flowchart.

When the meta-image data generation processing starts, image data is generated at first (step S400). For example, if the meta-image data generation processing is executed in the digital camera 20, the image data is generated by capturing an image. Alternatively, if the meta-image data generation processing is executed in an application program running on the computer 30, image data is generated by the application program. Further, when the meta-image data generation processing is executed when reading an original image by the scanner 40, image data is generated by reading the original image.

Then, a processing for compressing the data size of the generated image data is performed (step S402). That is, pixels are thinned at fixed intervals in the generated image data, so as to compress the image data in which the number of the pixels is relatively few.

Then, the compressed image data is converted into the image data of a colorimetric color space (step S404). When the image data is converted, the color space converting information which is stored in advance is read out, the image data according to the conversion information is converted. In addition, as described above, the color space converting information is for converting data of a color space in which the image data is generated to data of a standard color space which is set as a standard in advance. This information is described by a conversion formula, a conversion matrix, and a type of a so-called color profile.

Figure 16:
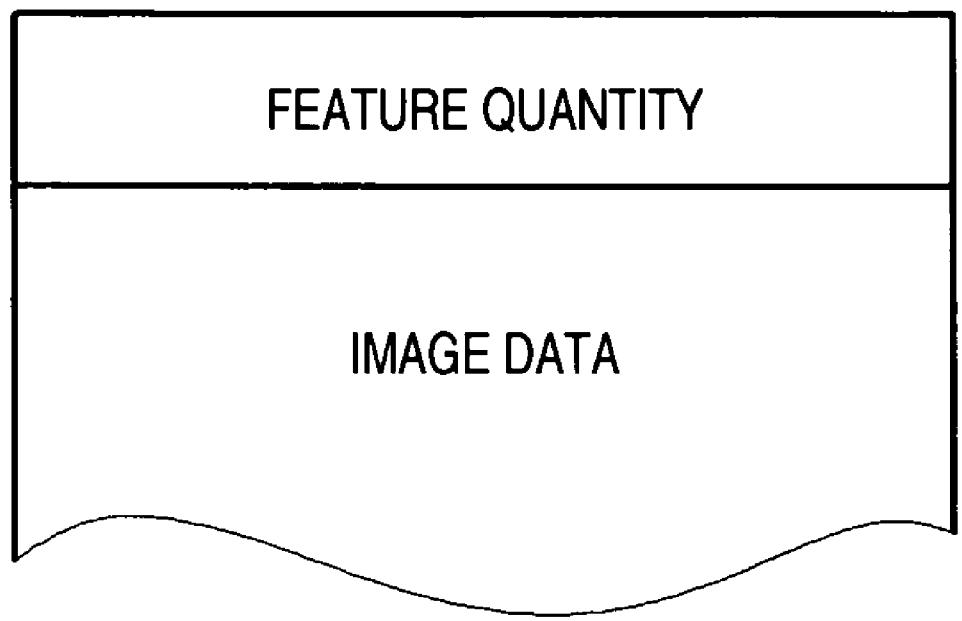
FIG. 16 is a diagram showing a state that a feature quantity extracted by the processing of FIG. 15 is added to a header of image data.

Then, the image data to be converted into the colorimetric color space is analyzed so as to extract a feature quantity of an image (step S406). Then, the extracted feature quantity is appended to a header of the generated image data so as to generate meta-image data (step S408) as shown in FIG. 16, and thereafter, the meta-image data generation processing shown in FIG. 15 is finished.

In the meta-image data generated by the above-described processing, the feature quantity in a colorimetric color space is added to the header part. Thereby, even if the image data of a color space is any data, the image data is not influenced by the difference of the color space, and the feature quantity can be collectively handled. As a result of this, for example, when an image is printed (or displayed on a screen), the image data corresponding to the feature quantity can be properly corrected so as to obtain a high-quality image. Further, the meta-image data is stored in a server so as to enable to collectively search all image data from a vast amount of the image data based on the feature quantity. Therefore, the desired image data can be quickly searched.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2006-34789 filed Feb. 13, 2006 including specification, drawings and claims is incorporated herein by reference in its entirety.

What is claimed is:

1. An apparatus operable to process image data, comprising:
   a receiver, operable to receive first image data described on the basis of RGB;
   an acquirer, operable to acquire color space converting information adapted to be used to convert the first image data into second image data described on the basis of a prescribed colorimetric color space;
   an analyzer, operable to extract a prescribed first feature quantity defined in RGB from the first image data;
   a converter, operable to convert the first feature quantity into a second feature quantity defined in the colorimetric color space, in accordance with the color space converting information; and
   an appender, operable to append the second feature quantity to a header part of the first image data as meta data to generate meta-image data.

2. An apparatus operable to process image data, comprising:
   a receiver, operable to receive first image data described on the basis of RGB;
   an acquirer, operable to acquire color space converting information adapted to be used to convert the first image data into second image data described on the basis of a prescribed colorimetric color space;
   an analyzer, operable to extract a prescribed first feature quantity defined in RGB from the first image data;
   a converter, operable to convert the first feature quantity into a second feature quantity defined in the colorimetric color space, in accordance with the color space converting information; and
   a divider, operable to divide the first image data into plural regions,
   wherein the first feature quantity is extracted from each of the regions of the first image data.

3. A method of analyzing image data, comprising:
   receiving first image data described on the basis of RGB;
   acquiring color space converting information adapted to be used to convert the first image data into second image data described on the basis of a prescribed colorimetric color space;
   extracting a prescribed first feature quantity defined in RGB from the first image data;
   converting the first feature quantity into a second feature quantity defined in the colorimetric color space, in accordance with the color space converting information; and
   appending the second feature quantity to a header part of the first image data as meta data to generate meta-image data.

* * * * *